United States Patent [19]

Schultenkamper

[11] 4,191,487
[45] Mar. 4, 1980

[54] TRANSMISSION SHAFT INDEXING COUPLING

[75] Inventor: Josef Schultenkämper, Essen, Fed. Rep. of Germany

[73] Assignee: Gelenkwellenbau GmbH, Essen, Fed. Rep. of Germany

[21] Appl. No.: 882,373

[22] Filed: Mar. 1, 1978

[30] Foreign Application Priority Data

Apr. 7, 1977 [DE] Fed. Rep. of Germany ....... 2715639

[51] Int. Cl.$^2$ .......................... F16D 1/00; F16L 23/00
[52] U.S. Cl. ..................................................... 403/337
[58] Field of Search ............... 403/335, 336, 337, 338; 64/21, 6; 180/43 R; 192/67 R

[56] References Cited

U.S. PATENT DOCUMENTS

| 3,136,565 | 6/1964 | Bischoff et al. ............... 180/43 R X |
| 4,053,248 | 10/1977 | Schultenkamper .................. 403/337 |

FOREIGN PATENT DOCUMENTS 548757  10/1956  Italy .......................................... 403/337

*Primary Examiner*—Wayne L. Shedd
*Attorney, Agent, or Firm*—Toren, McGeady and Stanger

[57] ABSTRACT

A transmission shaft assembly of the cardan type for transmitting torque from an input to an output includes a pair of universal joints with an intermediate connecting shaft between the joints. The universal joints are connected to the intermediate shaft on one side and a first coupling flange is connected to each universal joint on its other side. A second coupling flange is detachably connected by screw bolts to the first coupling flange of each universal joint, and each coupling flange has a plane end face with at least two groups of axially projecting gear teeth for torque transmission coupling between the flanges. The teeth of each group on each flange extend in a direction parallel to one another and have inclined side walls for engagement with the side walls of the teeth of the cooperating flange. The end face of one of the flanges of a cooperating pair has at least one raised flat surface between a pair of groups of teeth and the other flange has recessed surfaces between its groups of teeth for receiving the raised flat surfaces of the first flange. A clearance space is provided between cooperating raised flat surfaces and recessed surfaces and between the crests of the teeth of one of the flanges and bottoms of the valleys of the teeth of the other flange.

2 Claims, 4 Drawing Figures

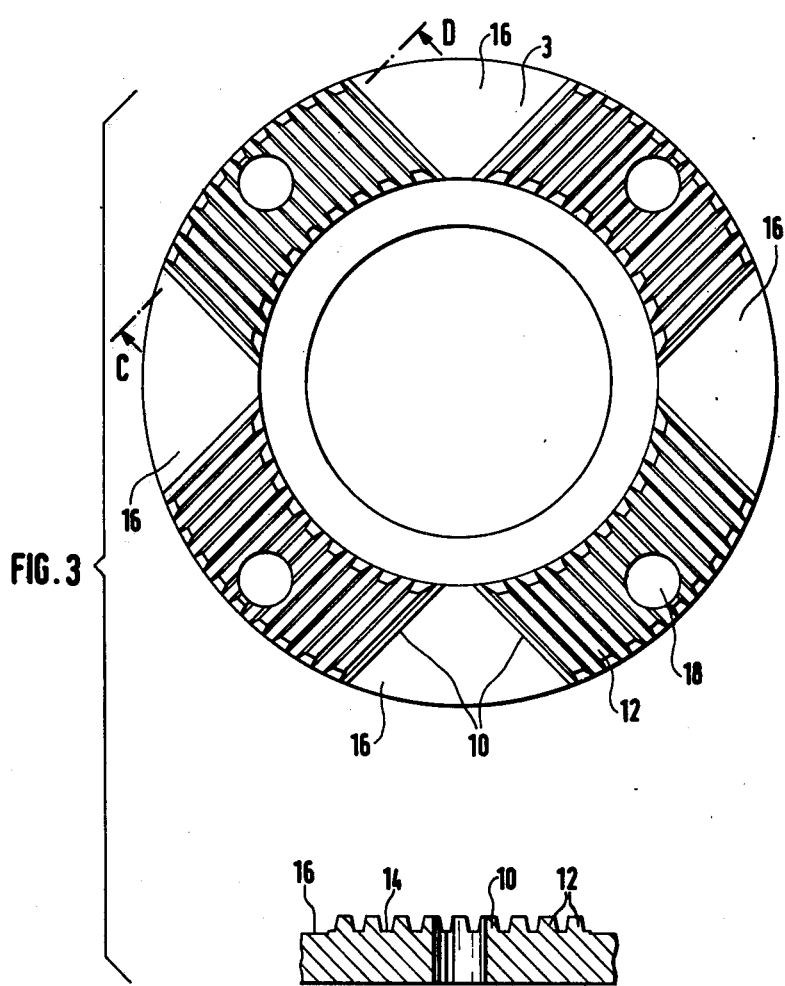

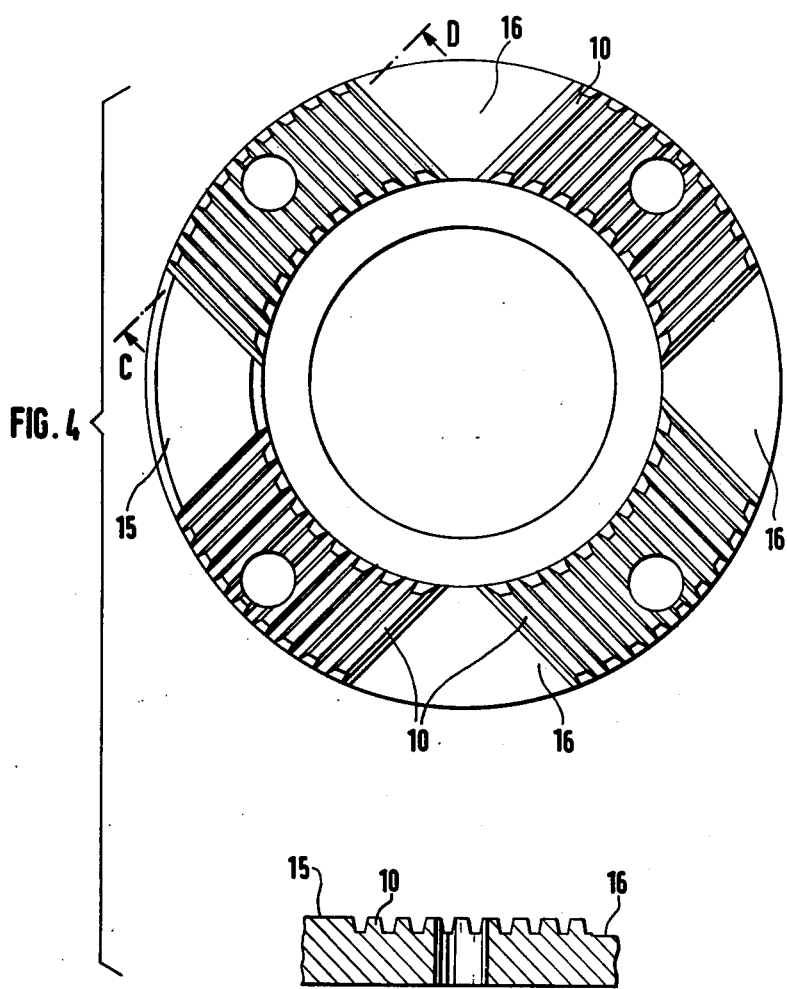

TRANSMISSION SHAFT INDEXING COUPLING

BACKGROUND OF THE INVENTION

The present invention relates generally to a cardan type transmission shaft assembly for transmitting torque from an input to an output, the assembly having a pair of universal joints with a connecting shaft therebetween and first and second coupling flanges associated with each universal joint through which torque may be transmitted from an input to an output, and more particularly to an arrangement of axially projecting teeth arranged in groups on the end faces of each of the flanges for transmitting torque from one coupling flange to the other.

Cardan type transmission shafts which have flange couplings of the foregoing type associated with the universal joints of the transmission shaft are usually used for high torque transmission capacity or when it is desired to reduce the amount or size of coupling bolts used for connecting members of the assembly together, such as for connecting an input shaft to one side of one of the universal joints, or for connecting one side of another of the universal joints to an output shaft.

The use of shims or other intermediate friction elements positioned between cooperating end faces of coupling flanges which are used for coupling input or output shafts to one side of a universal joint, are known, such as from German AS No. 1,223,200. When using these arrangements, high friction forces can be developed between the cooperating flanges by the use of appropriate materials so that large amounts of torque can be transmitted by friction between the coupling flanges. The use of such shims or additional friction discs complicate the assembly and increase the cost of the torque transmission assembly rendering such assemblies expensive and impractical.

In another prior arrangement, shown and described in German PS No. 440,816, torque is transmitted from one shaft member to another by using gear arrangements positioned concentric with the joint. The disadvantage of this arrangement, however, is that it is difficult to manufacture since each tooth of the gear arrangement must be formed by a separate cutting operation. In addition to the foregoing, coupling joints having gear arrangements which include groups of teeth extending at right angles to one another, are known. However, these arrangements have the disadvantage that the teeth are likely to be improperly aligned or may become angularly offset during the assembly of a pair of cooperating coupling flanges. Accordingly, unusual care is required to ensure that holes in each flange for receiving coupling bolts are properly aligned with the holes of its cooperating flange.

It is accordingly the principal object of the present invention to provide a transmission shaft assembly having torque transmitting coupling flanges, which overcomes the disadvantages of the prior art.

A more specific object of the present invention is to provide coupling flanges which may be associated with universal joints in a cardan type transmission shaft assembly, which have means for positive engagement with each other for easier assembly, for the elimination of any possible misalignment between the flanges and for ensuring that the bolt holes in each flange will always be aligned with the bolt holes of a cooperating flange when they are assembled.

Yet a further object of the present invention is to provide a novel structure for coupling flanges used in a cardan type transmission assembly, which are relatively inexpensive to manufacture, and which have groups of gear teeth that can be made by low cost manufacturing procedures, such as milling or surface broaching.

Other objects, features and advantages of the present invention will become more apparent from the description of the invention in connection with the accompanying drawings to be described more fully hereinafter.

SUMMARY OF THE INVENTION

The foregoing objects of the invention are generally accomplished by providing a pair of cooperating coupling flanges associated with each of the universal joints of a cardan type transmission shaft assembly, the flanges of a cooperating pair being adapted for rigid connection to each other by screw bolts, and each flange of a pair having plane end faces for mating engagement with each other. At least two groups of axially projecting teeth are arranged on the end faces of each flange of a pair for transmitting torque between the flanges, the teeth of each group extending in a direction parallel to each other and having inclined side walls for engagement with the side walls of the teeth on the cooperating flange of the pair. Raised flat surfaces are positioned between the groups of teeth on a first flange of a cooperating pair, the raised flat surfaces lying in the same plane as the crests of the teeth of the first flange. The end face of the second flange of a cooperating pair has recessed surfaces between its groups of teeth for receiving the raised flat surfaces of the first flange. A clearance space is provided between the raised flat surfaces of the first flange and the recessed surfaces of the second flange, and between the crests of the teeth of one of the flanges and the bottoms of the valleys of the teeth of the other flange when the flanges are bolted together. In this manner, torque may be transmitted between an input or output shaft and a universal joint of the transmission assembly through the cooperating coupling flanges.

The advantage of the foregoing arrangement is that the torque trnsmitting gear teeth can be easily and inexpensively machined onto the end faces of each of the flanges by conventional surface broaching or milling operations. Additionally, since all the teeth of any one group can be formed in the same machining operation, any possible misalignment or offset between any two teeth is avoided. The use of the raised flat surfaces which lie in the plane of the crests of the teeth of one of the coupling flanges of a pair and the recessed surfaces of the other flange ensure precise concentricity and therefore make for simple and reliable assembly.

The recessed surfaces in the other coupling flange also makes possible a choice of rotational positions for assembly of the flanges with each position being relatively centered.

To ensure precise interlocking engagement between the groups of teeth of the pair of flanges, a certain amount of clearance is provided between the flat surfaces which lie in the plane of the crests of the teeth of one of the flanges and the surfaces of the recess of the other flange, and is also provided between the crests of the teeth of one flange and the bottoms of the valleys between the teeth of the other flange (or vice versa). This ensures that the teeth of one flange will have actual contact engagement with the teeth of the other flange for proper torque transmission.

If only a single predetermined angular assembly position of one flange with respect to the other of a coupled pair of flanges is desired, each flange may be provided with two groups of teeth which extend at right angles to each other, with one of the flanges having a single raised flat surface lying in the plane of the crests of the teeth at one position between the groups of teeth and a recessed surface lying in the plane of the bottom of the valleys between the teeth at another position between the groups. The other flange of the cooperating pair will be provided with a corresponding raised flat surface lying in the plane of the crests of its teeth and a corresponding recessed surface for mating with the recessed surface and raised flat surface respectively of the other flange. This type of arrangement has the advantage that an initially balanced drive shaft with a cardan type transmission shaft and coupling flanges can be disassembled for repair, correction or other operation and reassembled in the same defined balanced angular position as originally assembled.

Another arrangement possible with the present invention is to provide for two alternate angular assembly positions. This is accomplished by providing that the cooperating coupling flanges have complementary pairs of raised flat surfaces lying in the plane of the tooth crests and a pair of recessed surfaces lying in the plane of the bottom of the valleys between the teeth.

Another feature of the present invention is to provide the bolt holes, which receive bolts for assembling the flanges together, positioned in the middle of a group of teeth. This will further ensure good contact engagement between the side walls of the teeth for effective torque transmission between the coupling flanges.

BRIEF DESCRIPTION OF THE DRAWINGS

Preferred embodiments of the present invention are more fully described in connection with the drawings annexed hereto, in which:

FIG. 3 is a front end view, and sectional view taken along lines C-D thereof, of one of the flanges illustrated in FIG. 2; and FIG. 4 is a view similar to that of FIG. 3 illustrating a modification of the embodiment shown in FIG. 3.

DESCRIPTION OF THE INVENTION

Figure 1:
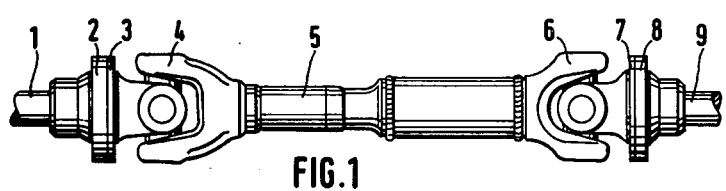
FIG. 1 is an elevational view of a cardan type transmission shaft assembly with a pair of coupling flanges associated with each of the universal joints.

FIG. 1 illustrates the transmission shaft assembly which includes a drive or input shaft 1, a first coupling flange 2 connected to the drive shaft 1, and a second flange 3 coupled with the first flange 2 and connected to one side of a universal joint 4 for transmitting torque from the drive shaft 1 to the universal joint 4. A second universal joint 6 is connected to universal joint 4 through an intermediate connecting shaft 5, which may be of the telescopically extendable type having a sleeve and a slidable interfitting member. Another pair of cooperating coupling flanges 7 and 8 couples universal joint 6 with a driven or output shaft 9. It will be seen that one side of each of the universal joints 4 and 6 is connected to opposite ends of the intermediate connecting shaft 5 and the other side of the universal joints 4 and 6 carry one of the pair of flanges, 3 and 7 respectively. The other of the pair of flanges, 2 and 8 respectively, are coupled to the flanges 3 and 7 for transmitting the torque from the input or drive shaft 1 to the universal joint 4, and from the universal joint 6 to the output or driven shaft 9.

Coupling flanges 3 and 7, which form component parts of the cardan type transmission shaft assembly, are securely connected to coupling flanges 2 and 8 respectively by means of threaded bolts 11 (see FIG. 2) through bolt holes 18 (FIG. 3) which extend through each of the flanges. Flange pairs 2,3 and 7,8 are coupled for torque transmission from one flange of the pair to the other by gear teeth groups 10. The use of the gear teeth groups 10 (not seen in FIG. 1) also ensures concentric alignment of the parts of the assembly.

Figure 2:
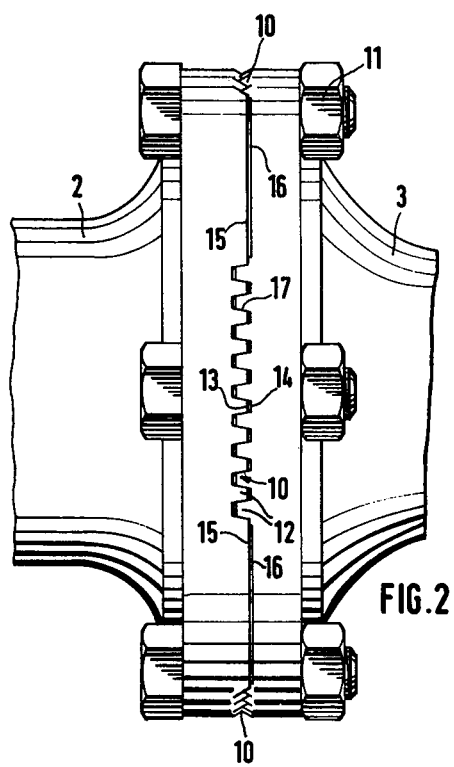
FIG. 2 is an enlarged side elevational view of an assembled cooperating pair of coupling flanges.

The coupling of the pairs of flanges (as for example the pair 2 and 3) can be more clearly appreciated from FIG. 2. Each of coupling flanges 2 and 3 are provided with bolt holes for receiving the screw bolts 11 which pass therethrough to securely hold the pair of flanges together. Each flange 2 and 3 is also provided with gearing groups 10 having gear teeth 12. Each of the gear teeth 12 of a group 10 extends in a direction parallel to each of the other teeth of the group. Each tooth 12 has a crest 13 and a root 14 at the bottom of the valley between adjacent teeth. It will be seen from FIG. 2 that a certain amount of clearance space is provided between the crests 13 of a gear group on one of the flanges and the roots 14 of the cooperating gear group on the other flange when the flanges are securely connected together by bolts 11. In other words, when the flanges 2 and 3 are fully assembled there is a certain distance or play between each crest 13 and the associated root 14 of the gear teeth on the opposite cooperating flange. Located between the groups 10 of gear teeth 12 on the end face of coupling flange 2 is a flat surface 15 which lies in the plane which passes through the crests 13 of each of the teeth of an adjacent group 10. Coupling flange 3 is provided with recessed surfaces 16 for receiving the raised flat surfaces 15 between the groups 10 on flange 2. There is also a certain amount of clearance between the raised flat surfaces 15 on coupling flange 2 and the surfaces of recesses 16 on flange 3. Preferably, the surface of recesses 16 lies in the plane which passes through the root 14 in the valleys between the teeth 12 on the groups 10 of flange 3. Surfaces 15 and 16 of cooperating flanges will therefore not be in contact with each other. Actual contact engagement between the flanges will take place only along the surfaces of inclined side walls 17 of each tooth.

Transmission of torque from one flange to the other will therefore be a result of the engagement between the side walls of opposite or meshing teeth. The use of screw bolts 11 which pass through the bolt holes will ensure sturdy and stable connection between the flanges.

FIG. 3 illustrates one arrangement of the groups 10 for flange 3. In this embodiment, two groups 10 of gear teeth are arranged at right angles with respect to one another. The two groups are divided into four segments spaced about the end face of the flange, each group therefore consisting of two segments positioned diametrically opposite each other. Each group includes gear teeth 12 which extend in a direction parallel to each of the teeth of its group. Each of the teeth of the other group will also be parallel to each other and will extend in a direction transverse to the direction of the teeth of the first group. Bolt holes 18 are shown as being positioned within the segments of each group, but may also be arranged within the recessed areas 16. In this embodiment flange 3 has four recessed areas 16 each of which are positioned between segments of groups 10. As will be appreciated from the section C-D, the bottom surface of the recesses 16 will lie approximately in a plane which passes through the roots 14 in the valleys between teeth 12. The cooperating coupling flange 2 will have a similar arrangement of groups 10 for positive meshing engagement with the groups on the flange 3, but will be provided with raised flat surfaces 15 which lie in a plane passing through the crests 13 of the teeth 12 so as to be received within the recesses 16 of flange 3.

FIG. 4 illustrates a modification of the embodiment in FIG. 3 in which flange 3 also has four segments of gear teeth 12 arranged in two perpendicular groups with the teeth of each group extending in a direction parallel to each tooth of the group and transverse to the direction of the teeth of the other group. In this embodiment only three recessed areas 16 are provided at positions between adjacent segments of the groups 10. Instead of the fourth recessed area, as in FIG. 3, a raised flat surface 15 lying in a plane extending through the crests 13 of the teeth 12 is provided. The cooperating flange 2 will have a corresponding recess 16 and three flat surfaces 15 for engagement with the flat surface 15 and three recessed areas 16 respectively of flange 3 so that when the flanges 2 and 3 are assembled only a single angular relationship between the flanges will be possible. This will permit disassembly and reassembly of the transmission shaft assembly in the same angular position each time.

While the present invention has been described and illustrated with respect to certain preferred embodiments which produce satisfactory results, it will be appreciated by those skilled in the art, after understanding the purposes of the invention, that various changes and modifications may be made without departing from the spirit and scope of the invention, and it is therefore intended to cover all such changes and modifications in the appended claims.

What is claimed is:

1. For use in a transmission shaft assembly comprising an axially extending drive shaft, an axially extending output shaft spaced from and in alignment with said drive shaft, an axially extending intermediate connecting shaft located between and in axial alignment with said drive shaft and output shaft, said intermediate shaft having a first end adjacent to and spaced from said drive shaft and a second end adjacent to and spaced from said output shaft, a first universal joint connected to the first end of said intermediate shaft and a second universal joint connected to the second end of said intermediate shaft, and means for detachably and rigidly connecting said first universal joint to said drive shaft and said second universal joint to said output shaft, wherein the improvement comprises that said means for detachably and rigidly connecting comprises a pair of couplings, one for connecting said drive shaft and said first universal joint and the other for connecting said output shaft and said second universal joint, each coupling of said pair of couplings comprises a first flange secured to one of said drive shaft or said output shaft and a second flange secured to one of said first universal joint or said second universal joint, said first and second flanges each having a face extending substantially perpendicularly of the axial direction of said intermediate shaft, each said face on said first and second flanges disposed in facing and mating relation to each other, each said face having two groups of teeth projecting therefrom with the teeth extending from the roots to the crests thereof in the axial direction of said intermediate shafts, each said group of teeth comprising a pair of segments of teeth with each segment located on a diametrically opposite side of said face from the other segment in said pair, said segment of teeth having an radially inner edge spaced outwardly from the axis of said face on which said segment is formed and a radially outer edge, each said segment of teeth on one said face being in meshed engagement with one said segment of teeth on the other face, said segments of teeth on each said face being spaced angularly apart about the axis of said intermediate shaft, said teeth in each said segment disposed in parallel relation and extending chordally across said face relative to the axis of said intermediate shaft, each of said teeth having the crests and roots thereof extending perpendicularly to the axis of said intermediate shaft and having a pair of opposite flanks sloping outwardly from the crest to the roots of said tooth, said teeth in adjacent said segments on each said face being disposed in substantially perpendicular relation, adjacent said segments of teeth on said face being spaced apart from a sector-like shaped planar surface, one of said faces having three raised said planar surfaces located in the plane of the crests of said teeth located thereon and one recessed said planar surface located in the plane of the roots of said teeth located thereon and the other said face having three recessed said planar surfaces located in the plane of the roots of said teeth thereon and one raised said planar surface located in the plane of the crests of said teeth located thereon so that said raised and recessed planar surfaces intermesh and align said segments of teeth and afford alignment of the transmission shaft assembly and also assure after disassembly and reassembly that the same angular relationship between the parts of the transverse shaft assembly are maintained, and with said first and second flanges in meshed engagement with one another the sloping flanks of said teeth in said segments of teeth thereon are in contact engagement and said juxtaposed planar surfaces between said groups of teeth and said juxtaposed tooth crests and roots on said segments of teeth are disposed in closely spaced relation forming a clearance space therebetween whereby torque can be transmitted through each of said couplings from said drive shaft to said output shaft.

2. For use in a transmission shaft assembly, as set forth in claim 1, wherein each of said faces has a plurality of bolt holes angularly spaced apart and extending therethrough in parallel relation with the axis of said intermediate shaft, said bolt holes corresponding in number to said segments of teeth in said face and each said bolt hole extending through a different one of said segments of teeth in angularly spaced relation from the adjacent said planar surfaces located between said segments of teeth.

* * * * *